(12) United States Patent
Suryanarayana

(10) Patent No.: US 12,547,724 B2
(45) Date of Patent: Feb. 10, 2026

(54) FIRMWARE GUARD EXTENSION WITH CONVERGED DEFENSE ENGINE

(71) Applicant: DELL PRODUCTS L.P., Round Rock, TX (US)

(72) Inventor: Shekar Babu Suryanarayana, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 229 days.

(21) Appl. No.: 17/965,953

(22) Filed: Oct. 14, 2022

(65) Prior Publication Data

US 2024/0126884 A1 Apr. 18, 2024

(51) Int. Cl.
*G06F 21/57* (2013.01)
*G06F 21/54* (2013.01)

(52) U.S. Cl.
CPC ............ *G06F 21/572* (2013.01); *G06F 21/54* (2013.01); *G06F 21/575* (2013.01)

(58) Field of Classification Search
CPC ....... G06F 21/54; G06F 21/572; G06F 21/575
See application file for complete search history.

(56) References Cited

U.S. PATENT DOCUMENTS

| 9,679,143 | B2* | 6/2017 | Desai ...................... G06F 13/28 |
| 9,886,833 | B2 | 2/2018 | Noland et al. |
| 10,516,533 | B2 | 12/2019 | Mannan et al. |
| 10,856,127 | B2 | 12/2020 | Maier et al. |
| 10,917,439 | B2 | 2/2021 | Puratheppparambil et al. |
| 11,472,552 | B2 | 10/2022 | Gil et al. |
| 2005/0094654 | A1* | 5/2005 | Weisler .................. H04Q 3/521 370/412 |
| 2013/0282906 | A1* | 10/2013 | An .......................... H04L 41/04 709/226 |
| 2014/0033268 | A1* | 1/2014 | Julisch .................... H04L 63/20 726/1 |
| 2014/0115292 | A1* | 4/2014 | Mclachlan ............. G06F 21/14 711/170 |
| 2014/0237545 | A1* | 8/2014 | Mylavarapu ........ H04L 63/1441 726/25 |
| 2014/0281458 | A1* | 9/2014 | Ravimohan ........... G06F 9/4401 713/2 |
| 2019/0122172 | A1 | 4/2019 | Gil et al. |
| 2020/0294401 | A1 | 9/2020 | Kerecsen |
| 2020/0358872 | A1 | 11/2020 | Shribman et al. |
| 2020/0389469 | A1 | 12/2020 | Litichever et al. |
| 2021/0356279 | A1 | 11/2021 | Szigeti |
| 2022/0108007 | A1* | 4/2022 | Zatutschne-Marom ..................... G06F 21/52 |

FOREIGN PATENT DOCUMENTS

WO    WO-2012018525 A2 *  2/2012  ......... G06F 12/1433

* cited by examiner

*Primary Examiner* — Jason D Recek
(74) *Attorney, Agent, or Firm* — Jackson Walker LLP; Christopher J. Rourk

(57) ABSTRACT

A system for data protection, comprising an address mapping state machine configured to receive address data and protection data and to generate runtime address data, a firmware extension table coupled to a plurality of adders that are configured to receive data derived from the runtime address data and to output mapped runtime address data and a plurality of external components configured to receive the mapped runtime address data and to utilize the mapped runtime address data for one or more predetermined functions.

20 Claims, 3 Drawing Sheets

FIRMWARE GUARD EXTENSION WITH CONVERGED DEFENSE ENGINE

TECHNICAL FIELD

The present disclosure relates generally to data security, and more specifically to a firmware guard extension with a converged defense engine.

BACKGROUND OF THE INVENTION

Data security is often a target of attacks from third parties, who exploit design defects of data processing systems.

SUMMARY OF THE INVENTION

A system for data protection is disclosed. The system includes an address mapping state machine configured to receive address data and protection data and to generate runtime address data as a function of the received data. A firmware extension table is coupled to a plurality of adders that are each configured to receive data derived from the runtime address data and to output mapped runtime address data. A plurality of external components are configured to receive the mapped runtime address data and to utilize the mapped runtime address data for one or more predetermined functions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
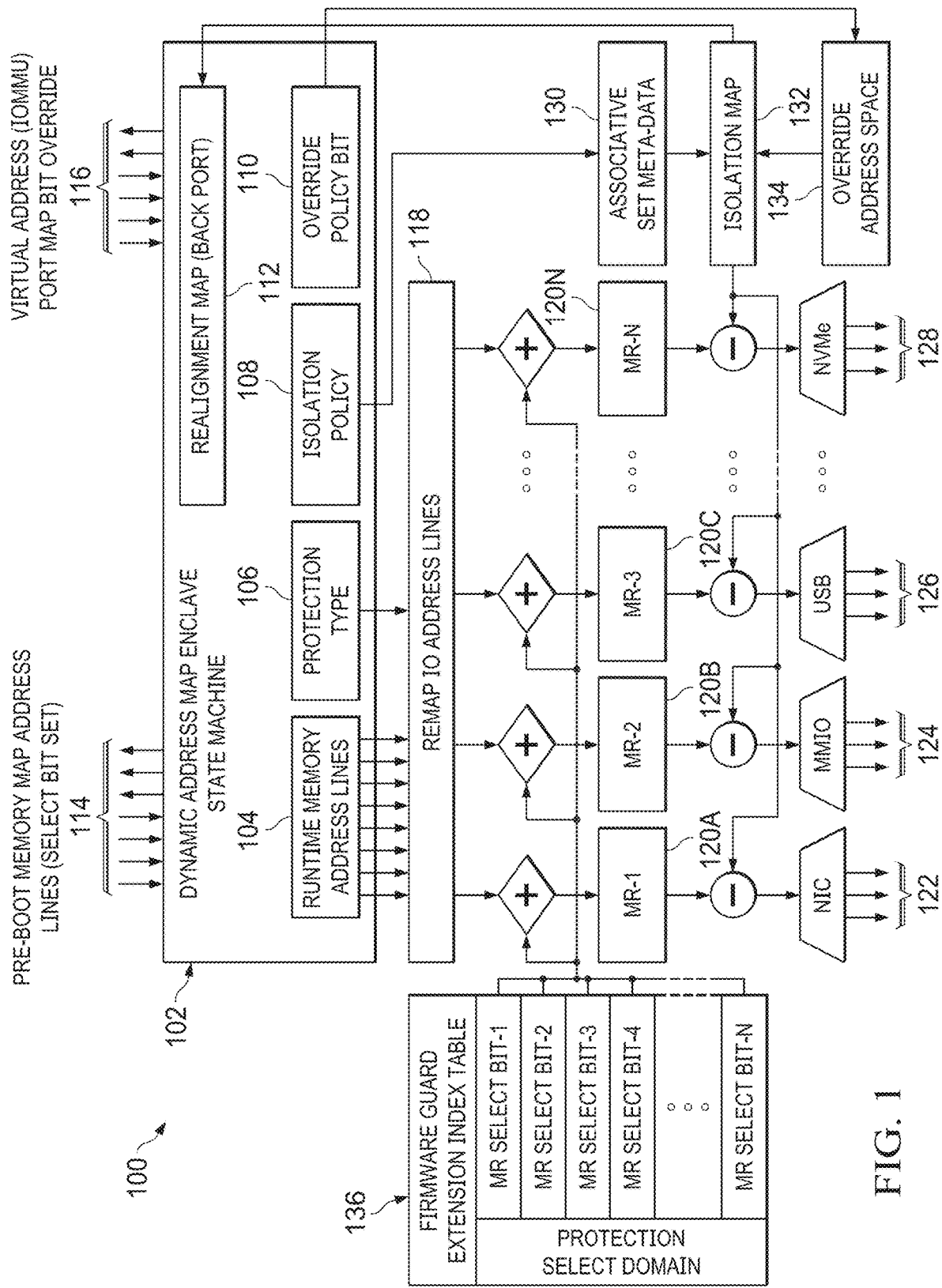
FIG. 1 is a diagram of a system for providing a firmware guard extension, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure allows BIOS to create Firmware Extension Guard Table during a PEI MRC phase. Domain-based memory regions area can also be created at various offsets which are remapped to a protected region of OS address space. The IOMMU/Unity-Map address space can be re-aligned with a pre-boot memory region based remap. The address lines can go beyond the OS virtual address space and can be completely isolated from the OS/Kernel, such that no running program can decode the BIOS MR based remap address space. In one example embodiment, a trap into ring—0 cannot decode the address space, and a firmware extension guard protocol (FGP) can be used to perform translation in the hidden address space. A driver or third party vendor code that runs in high protection mode can register and run within a dynamic address map enclave (DAME) context, where the guard protocol does the translations as needed.

Using DAME, third party vendor drivers and/or high privilege OS modules can register with FGP and safely run without causing an address map corruption or violation. No vulnerability can be used to escalate the privilege into ring 0. The present disclosure thus provides a safe protective shield for customer and/or vendor modules to run safely and without interruption at runtime.

The FGP generates memory regions for various domains that are outside of the IOMMU and/or Unity-Map address range, which can be used to keep these memory maps hidden from OS runtime drivers and/or programs, so that they cannot be exploited or corrupted. The FGP protocol realigns and remap this memory space to execute with DAME context in a safe manner.

Software and firmware side channel attacks on processor architectures can exploit the memory tag state as their exfiltration channel. Privilege escalation attacks typically involve the exploitation of vulnerabilities such as software bugs, misconfigurations, and incorrect access controls. By taking over a low-level user account and either exploiting improperly-assigned security and data access privileges, or increasing those privileges in order to exploit them, a malicious attacker can obtain an entry point to a sensitive system. Attackers might dwell in a system for some time, performing reconnaissance and waiting for an opportunity to deepen their access. Eventually, they may identify a way to escalate privileges to a higher level than the account that was initially compromised.

Processor memory-mapped input/output (MMIO) stale data vulnerabilities can expose private data. Most of the vulnerabilities require the attacker to have access to MMIO space, and operating system (OS) or virtual machine (VM) drivers that use an MMIO map in the OS runtime environments can be affected. For example, system environments using virtualization where MMIO access is provided to untrusted guests can be impacted.

Some peripheral component interconnect (PCI) devices in a system might be assigned to reserved memory regions, which are typically used for platform tasks such as universal serial bus (USB), network interface card (NIC), graphics or data storage device emulation. Once a device associated with such a region is active, the mappings of these regions need to remain continuously accessible by the device. If this requirement has been violated, subsequent direct memory access (DMA) or interrupts from the device may have unpredictable behavior, ranging from input/output memory management unit (IOMMU) faults to memory corruption. Memory corruption arising from IOMMU faults can be severe enough to bring down the system.

An example of a relevant security issue was discovered in the NvmExpressDxe/AhciBusDxe driver, where a system management mode (SMM) memory corruption vulnerability allowed an attacker to write fixed or predictable data to system management random access memory (SMRAM). Allowing that weakness to be exploited could be used to escalate SMM privileges to gain unauthorized access to within a security perimeter.

Another example of a vulnerability used an SMM driver to register a system management interrupt (SMI) that is not sufficiently protected to ensure that the communication buffer's nested contents are not pointing to SMRAM contents. A potential attacker could exploit this weakness to write fixed data to SMRAM, which could lead to data corruption inside that memory space, such as by changing the SMI handler's code or to modify SMRAM map structures to break input pointer validation for other SMI handlers. An attacker could elevate privileges from ring 0 to ring 2 and execute arbitrary code in SMM.

Yet another reported weakness involved WIFI system firmware, where there was a possible memory corruption due to a use after free. An attacker could use that weakness to implement a remote escalation of privilege, to allow the attacker to connect devices to an attacker-controllable Wi-Fi mode with no additional execution privileges needed.

Memory corruption could also result from a CPU integer overflow in an OS kernel driver, which could lead to local escalation of privilege with system execution privileges needed. User interaction is not needed for this kind of exploitation, which can corrupt the system and cause the system to reach a non-bootable state.

The present disclosure provides a firmware guard extension into both pre-boot and OS space memory maps by creating a protective shield to prevent any runtime memory vulnerabilities. A converged defense engine is used to defend a transient execution into a corrective path and retire. A DAME can provide a generic mechanism for secure way partitioning of a set of associative structures, including runtime memory. The DAME can be implemented as a set associative structure and table with protection domains, to provide strong isolation. A peripheral component interconnect express (PCIe) input/output (I/O) remapping with address bypass metadata can provide extended protection across memory domains such as storage, network, USB and so forth.

By providing an emphasis on a vulnerability identification and mitigation acceleration strategy, the present disclosure provides value with firmware guard extension into both the pre-boot and OS space memory maps, by creating a protective shield to prevent any runtime memory OS/Pre-boot vulnerabilities.

A converged defense engine is disclosed that brings the transient execution into the corrective path, using predictions based on the memory access range. The disclosed dynamic address map enclave provides a secure way to protect all registered memory domain addresses with strong isolation within the map enclave. Privilege escalations from the network and USB domains are guarded with PCIe remap bypass metadata table.

The present disclosure provides a security vulnerability acceleration strategy for new product integration firmware. A firmware guard extension is implemented in both pre-boot and OS space memory maps by creating a protective shield to prevent any runtime memory vulnerabilities. A converged defense engine is built using predictive processes to defend the transient execution into a corrective path and retire.

The DAME state machine can be implemented with runtime memory address lines used as input to remap I/O address lines. The firmware guard extension index table can store a domain to protection bit and memory region (MR) index that can be used to locate an I/O remapped MR. Based on the protection type for each memory domain, security can be implemented using key based decoding, to locate the address as well as data lines.

An isolation policy is also disclosed that uses an OS-based virtual address and realignment map, such as by using RAND values for a back port from a pre-boot memory reference code (MRC). An associative set of metadata and an isolation map (which is not located by OS/VM as this address space is completely isolated) can be generated.

The override policy and its corresponding address space can be used to map each MR of a memory domain and remap it as isolated hidden device addresses. The proposed solution can implement a Converged Defense Engine (CDE) to provide a speculative prediction to defend against transient execution into a corrective path. This functionality can be provided to suitable third party drivers and OS modules, which can register for CDE events. The CDE can be used to implement the map event queue over the IOMMU, cache, GPU and DMA address map, and to create an I/O remap address range to sample for registered modules.

The CDE initialization can be implemented in pre-boot during the pre-EFI initialization (PEI) phase MRC, and can allocate and initialize the IOMMU for processors. An event queue can be created for queue entry mapping to an address range, such as an index table. During OS boot, the CDE domain memory along with the pre-map offsets can be re-mapped to OS runtime memory, and drivers can register for speculative vulnerability prediction and detection. Remediation and mitigation support can be used for events based on the type of vulnerability.

The CDE can initialize the registered module based on type. If no relocation is needed, then detection and mitigation action can be provided for violations. If a module requires relocation, the CDE can create a protective shield where the third party drivers or OS modules are executed in a safe enclave, where no vulnerable actions can be performed. The shield is hidden and address range is dynamically remapped to different offsets, which are not exposed to the OS.

FIG. 1 is a diagram of a system 100 for providing a firmware guard extension, in accordance with an example embodiment of the present disclosure. System 100 includes dynamic address map enclave state machine 102, which includes runtime memory address lines 104, protection type 106, isolation policy 108, override policy bot 110 and back port realignment map 112, virtual address (IOMMU) port map bit override 116, remap I/O address lines 118, memory region index 120A-N, NIC output 122, MMIO output 124, USB output 126, mobile virtual network enabler (MVNe) output 128, associative set metadata 130, isolation map 132, override address space 134 and firmware guard extension index table 136, each of which can be implemented in hardware or a suitable combination of hardware and software.

Dynamic address map enclave state machine 102 can be implemented in hardware or a suitable combination of hardware and software, and can include runtime memory address lines 104 that are configured for input into remap IO address lines 118. Firmware guard extension index table 130 stores a domain to protection bit and memory region (MR) index that can be used in conjunction with inputs from remap to address lines 118 through adders to provide inputs to memory region indices 120A-N.

Runtime memory address lines 104 can be implemented in hardware or a suitable combination of hardware and software and can be used by dynamic address map enclave state machine 102 to interface with remap IO address lines 118.

Protection type 106 can be implemented in hardware or a suitable combination of hardware and software and can be used to implement a protection type for each memory domain of the security, to select whether to implement the protection, to implement key based decoding to locate the address, in conjunction with remap to IO address lines 118.

Isolation policy 108 can be implemented in hardware or a suitable combination of hardware and software and can implement an OS-based virtual address and realignment map, such as using a back port from pre-boot MRC-based random values. Associative set meta-data 130 can be located and isolation map 132 can be generated. Isolation map 132 can be configured to use data other than that located by OS/VM, such as when the address space is completely isolated.

Override policy bit 110 can be implemented in hardware or a suitable combination of hardware and software, and can be used to implement an override policy or for other suitable purposes. In one example embodiment, a corresponding override address space 134 can be used to map each of MR-1 though MR-N of the memory domains and to remap hidden device addresses as isolated, or other suitable configurations can also or alternatively be used.

Back port realignment map 112 can be implemented in hardware or a suitable combination of hardware and software and can interface with virtual address (IOMMU) port map bit override 116 and isolation map 132, as discussed and described further herein.

Remap I/O address lines 118 can be implemented in hardware or a suitable combination of hardware and software and can interface with runtime memory address lines 104, protection type 106 and the adders coupled to firmware guard extension index table 130 and memory region indices 120A-N. In one example embodiment, remap I/O address lines 118 can receive protection type data and, based on the protection type for each memory domain and the security (if implemented), key based decoding can be performed to locate the address as well as data lines.

NIC output 122 can be implemented in hardware or a suitable combination of hardware and software, and is configured to receive isolation mapped address data from a subtractor coupled to memory region index 120A and isolation map 132, as discussed and described further herein. NIC output 122 generates mapped address data for use by a network interface card or other suitable systems.

MMIO output 124 can be implemented in hardware or a suitable combination of hardware and software, and is configured to receive isolation mapped address data from a subtractor coupled to memory region index 120B and isolation map 132, as discussed and described further herein. MMIO output 124 generates mapped address data for use by memory mapped input output or other suitable systems.

USB output 126 can be implemented in hardware or a suitable combination of hardware and software, and is configured to receive isolation mapped address data from a subtractor coupled to memory region index 120C and isolation map 132, as discussed and described further herein. USB output 126 generates mapped address data for use by a universal serial bus card or other suitable systems.

MVNe output 128 can be implemented in hardware or a suitable combination of hardware and software, and is configured to receive isolation mapped address data from a subtractor coupled to memory region index 120N and isolation map 132, as discussed and described further herein. MVNe output 128 generates mapped address data for use by a mobile virtual network enabler or other suitable systems.

Associative set metadata 130 can be implemented in hardware or a suitable combination of hardware and software, and can be associated with an isolation policy that is based on an OS-based virtual address and realignment map or other suitable data.

Isolation map 132 can be implemented in hardware or a suitable combination of hardware and software, and is an address space that is generated and is completely isolated, so that it is not located by OS/VM.

Override address space 134 can be implemented in hardware or a suitable combination of hardware and software, and its corresponding address space can be used to map each memory region index of every memory domain as isolated hidden device addresses.

Firmware guard extension index table 136 can be implemented in hardware or a suitable combination of hardware and software, and can be implemented into both pre-boot and OS space memory maps by creating a protective shield to prevent any runtime memory vulnerabilities. A converged defense engine can be built that is a speculative prediction to defend the transient execution into a corrective path and retire, as discussed and described in further detail herein.

In operation, system 100 provides a firmware guard extension with a converged defense engine to protect memory addresses from third party attack, failure or other problems.

Figure 2:
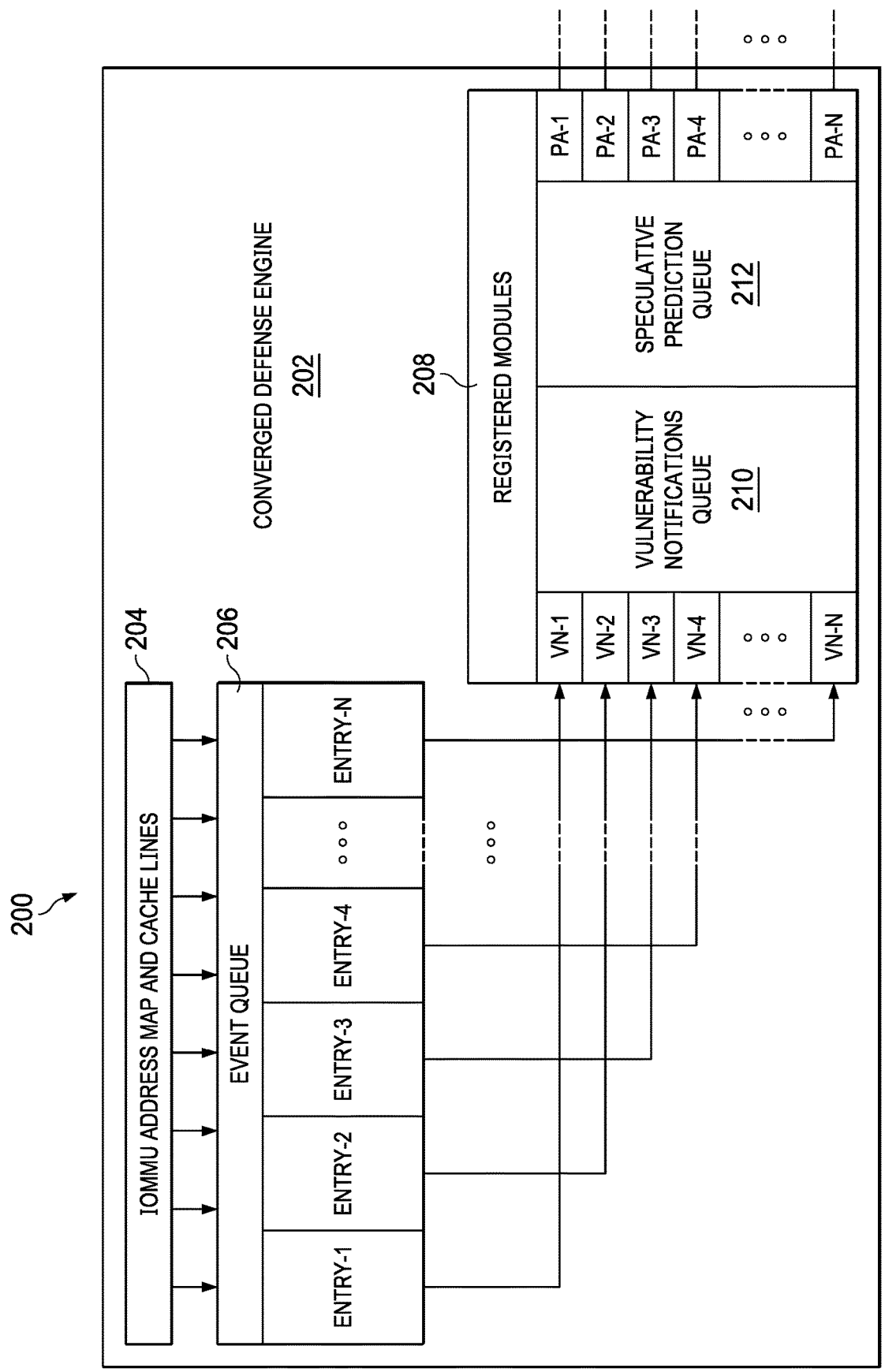
FIG. 2 is a diagram of a system for providing a converged defense engine, in accordance with an example embodiment of the present disclosure.

FIG. 2 is a diagram of a system 200 for providing a converged defense engine, in accordance with an example embodiment of the present disclosure. System 200 includes converged defense engine 202 that further includes IOMMU address map and cache lines 204, event queue 206, registered modules 208, vulnerability notifications queue 210 and speculative prediction queue 212.

Converged defense engine 202 can be implemented in hardware or a suitable combination of hardware and software, and can be configured to provide a speculative prediction to defend against transient execution into a corrective path. To avail this functionality, third party drivers and OS modules can register for converged defense engine events, and converged defense engine 202 can implement a map event queue over the IOMMU, cache, GPU, DMA and other suitable components, such as by using an address map and creating a TO remap address range to sample for registered modules or in other suitable manners.

The CDE initializes the registered module based on type. If no relocation is needed, then detection and mitigation actions are provided for possible violations. For those modules that need relocation, the CDE creates a protective shield where the third party drivers or OS modules can be executed in a safe enclave where no vulnerable actions can be performed, as the shield is hidden and the address range is dynamically remapped to different offsets which are not exposed to the OS. A PCIe IO remap with address bypass metadata can also provide extended protection across memory domains like storage, network, USB and so forth.

IOMMU address map and cache lines 204 can be implemented in hardware or a suitable combination of hardware and software, and can be initialized in pre-boot during the PEI phase MRC. The IOMMU (for Intel), Unity-Map (for AMD processors) or other equivalent components can be used to allocate and initialize event queue 206, as discussed and described in further detail herein.

Event queue 206 can be implemented in hardware or a suitable combination of hardware and software, and is coupled to IOMMU address map and cache lines 204 and registered modules 208. Event queue 204 can be configured to generically process entries for a queue entry mapping of entry-1 through entry-N to an address range of an index table, or other suitable components.

Registered modules 208 can be implemented in hardware or a suitable combination of hardware and software, and is configured to register a plurality of modules for mapping for protection, as discussed and described in further detail herein.

Vulnerability notifications queue 210 can be implemented in hardware or a suitable combination of hardware and software, and is configured to remap converged defense engine 202 domain memory along with the pre-map offsets during OS boot to OS runtime memory.

Speculative prediction queue 212 can be implemented in hardware or a suitable combination of hardware and software, and is configured to receive vulnerability notifications queue 210 data for VN-1 through VN-N for driver registers, and to provide speculative vulnerability prediction/detection, such as by mapping to PA-1 through PA-N, for remediation/mitigation support, to get events based on the type of vulnerability.

Figure 3:
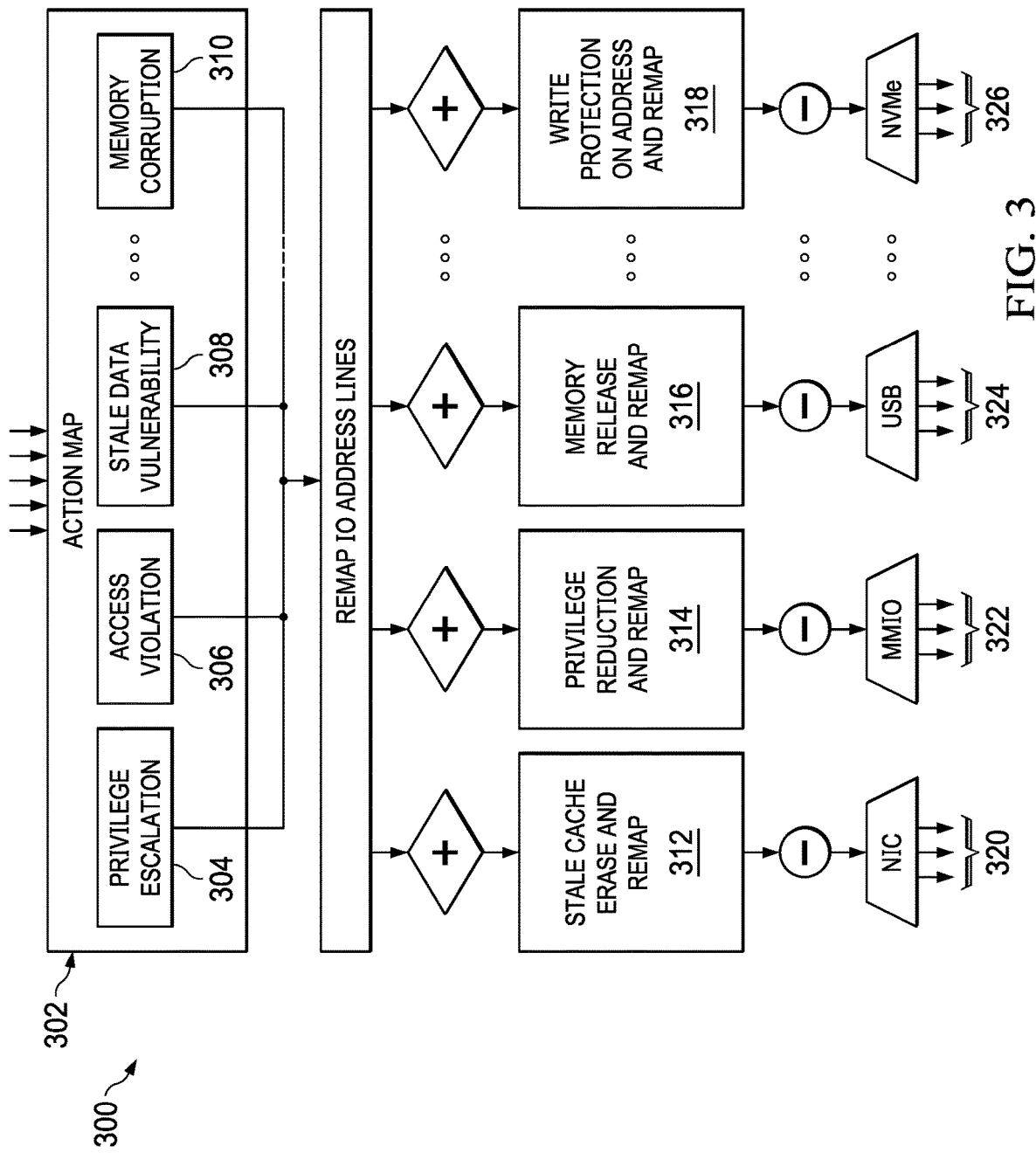
FIG. 3 is a diagram of a system for providing a converged defense engine, in accordance with an example embodiment of the present disclosure.

FIG. 3 is a diagram of a system 300 for providing a converged defense engine, in accordance with an example embodiment of the present disclosure. System 300 includes action map 302, which further includes privilege escalation 304, access violation 306, stale data vulnerability 308, memory corruption 310, remap IO address lines 328, stale cache erase and remap 312, privilege reduction and remap 314, memory release and remap 316, write protection on address and remap 318, NIC 320, MMIO 322, USB 324 and NVMe 326.

Action map 302 can be implemented in hardware or a suitable combination of hardware and software, and is configured to receive data from speculative prediction queue 212 for registered modules or other suitable functions. In one example embodiment, action map 302 can process the data and determine whether it is associated with a privilege escalation, an access violation, a stale data vulnerability, memory corruption or other associated actions.

Privilege escalation 304 can be implemented in hardware or a suitable combination of hardware and software, and is configured to determine whether protection is required from a privilege escalation attack. In one example embodiment, special processing associated with a privilege escalation attack can be implemented, as further discussed and described herein.

Access violation 306 can be implemented in hardware or a suitable combination of hardware and software, and is configured to determine whether protection is required from an access violation. In one example embodiment, special processing associated with an access violation can be implemented, as further discussed and described herein.

Stale data vulnerability 308 can be implemented in hardware or a suitable combination of hardware and software, and is configured to determine whether protection is required from a stale data attack. In one example embodiment, special processing associated with a stale data attack can be implemented, as further discussed and described herein.

Memory corruption 310 can be implemented in hardware or a suitable combination of hardware and software, and is configured to determine whether protection is required from memory corruption. In one example embodiment, special processing associated with memory corruption can be implemented, as further discussed and described herein.

Remap IO address lines 328 can be implemented in hardware or a suitable combination of hardware and software, and is configured to interface with adders that receive other associated data to implement remapping of IO address lines, as discussed and described in further detail herein.

Stale cache erase and remap 312 can be implemented in hardware or a suitable combination of hardware and software, and is configured to erase and remap stale cache data to provide additional protection, as discussed and described further herein. Stale cache erase and remap 312 is configured to interface with adders and subtractors that receive other associated data, as discussed and described in further detail herein.

Privilege reduction and remap 314 can be implemented in hardware or a suitable combination of hardware and software, and is configured to reduce access privileges and remap data to provide additional protection, as discussed and described further herein. Privilege reduction and remap 314 is configured to interface with adders and subtractors that receive other associated data, as discussed and described in further detail herein.

Memory release and remap 316 can be implemented in hardware or a suitable combination of hardware and software, and is configured to release and remap memory to provide additional protection, as discussed and described further herein. Memory release and remap 316 is configured to interface with adders and subtractors that receive other associated data, as discussed and described in further detail herein.

Write protection on address and remap 318 can be implemented in hardware or a suitable combination of hardware and software, and is configured to provide write protection on address and remap memory to provide additional protection, as discussed and described further herein. Write protection on address and remap 318 is configured to interface with adders and subtractors that receive other associated data, as discussed and described in further detail herein.

NIC 320, MMIO 322, USB 324, NVMe 326 can be implemented in hardware or a suitable combination of hardware and software, and are configured to receive and process remapped address data to provide additional protection from malicious attacks and misoperation, as further discussed and described herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for data protection, comprising:
receiving address data and protection data at a dynamic address map enclave [DAME] state machine;
generating runtime address data;
receiving data derived from the runtime address data at a firmware extension table coupled to a plurality of adders;
outputting mapped runtime address data;
receiving the mapped runtime address data at a plurality of external components;
utilizing the mapped runtime address data for one or more predetermined functions; and
remapping a converged defense engine domain memory with pre-map offsets during OS boot to OS runtime memory.

2. The method of claim 1 further comprising generating memory domain protection type data for use with the runtime address data.

3. The method of claim 1 further comprising generating isolation policy data for use with the runtime address data.

4. The method of claim 1 further comprising generating an output to an isolation map.

5. The method of claim 1 further comprising providing isolation map data to the mapped runtime address data.

6. The method of claim 1 further comprising:
generating an output to an isolation map; and
providing isolation map data to the mapped runtime address data as a function of an output from an associative set metadata system.

7. The method of claim 1 further comprising generating indexed address data.

8. The method of claim 1 further comprising receiving an event queue entry and mapping the event queue entry to a vulnerability.

9. The method of claim 1 further comprising processing entries for a queue entry mapping to an address range of an index table.

10. A system for data protection comprising:
one or more processors having code stored in a working memory that cause the one or more processors, when executed, to perform functions of:
receiving address data and protection data at a dynamic address map enclave [DAME] state machine;
generating runtime address data;
receiving data derived from the runtime address data at a firmware extension table coupled to a plurality of adders;
outputting mapped runtime address data;
receiving the mapped runtime address data at a plurality of external components;
utilizing the mapped runtime address data for one or more predetermined functions; and
remapping a converged defense engine domain memory with pre-map offsets during OS boot to OS runtime memory.

11. The system of claim 10 wherein the code causes the one or more processors to perform the function of generating memory domain protection type data for use with the runtime address data.

12. The system of claim 10 wherein the code causes the one or more processors to perform the function of generating isolation policy data for use with the runtime address data.

13. The system of claim 10 wherein the code causes the one or more processors to perform the function of generating an output to an isolation map.

14. The system of claim 10 wherein the code causes the one or more processors to perform the function of providing isolation map data to the mapped runtime address data.

15. The system of claim 10 wherein the code causes the one or more processors to perform the function of:
generating an output to an isolation map; and
providing isolation map data to the mapped runtime address data as a function of an output from an associative set metadata system.

16. The system of claim 10 wherein the code causes the one or more processors to perform the function of generating indexed address data.

17. The system of claim 10 wherein the code causes the one or more processors to perform the function of receiving an event queue entry and mapping the event queue entry to a vulnerability.

18. The system of claim 10 wherein the code causes the one or more processors to perform the function of processing entries for a queue entry mapping to an address range of an index table.

19. A method for data protection, comprising:
receiving address data and protection data at a dynamic address map enclave [DAME] state machine;
generating runtime address data;
receiving data derived from the runtime address data at a firmware extension table coupled to a plurality of adders;
outputting mapped runtime address data;
receiving the mapped runtime address data at a plurality of external components;
utilizing the mapped runtime address data for one or more predetermined functions;
remapping a converged defense engine domain memory with pre-map offsets during OS boot to OS runtime memory;
generating isolation policy data for use with the runtime address data; and
generating an output to an isolation map.

20. The method of claim 19 further comprising providing isolation map data to the mapped runtime address data.

* * * * *